Jan. 13, 1970 W. W. HARDIN ET AL 3,490,002

COMPLETE SCANNING CYCLE DETECTOR FOR CHARACTER RECOGNITION SYSTEMS

Filed March 14, 1966 2 Sheets-Sheet 1

INVENTORS
WILLIAM W. HARDIN
JAMES J. KENNEDY
NORMAN R. PLUMMER

BY Paul M. Brenner
AGENT

United States Patent Office 3,490,002

Patented Jan. 13, 1970

3,490,002
COMPLETE SCANNING CYCLE DETECTOR FOR CHARACTER RECOGNITION SYSTEMS

William W. Hardin, Stewartville, and James J. Kennedy, Rochester, Minn., and Norman R. Plummer, Owego, N.Y., assignors to International Business Machines Corporation, Armonk, N.Y., a corporation of New York Filed Mar. 14, 1966, Ser. No. 534,178
Int. Cl. G06k *9/00;* G05b *1/00*
U.S. Cl. 340—146.3 1 Claim

ABSTRACT OF THE DISCLOSURE

This invention is directed to a system for detecting the completion of a scan of a character by a circle following scanning system. The completion of an entire scan is detected by requiring that the scanning beam traverse two specific locations located along the scanning path which is followed in scanning a character, one of which constitutes a band extending across the character. When the scanning process commences, analog voltages are set up which are utilized for determining the limits of particular locations concerned with the dimension of the character. Selected ones of these values are stored to provide two sets of limits which designate the band and a particular area, or box on the scanning path of the character. When these particular locations have been traversed in the proper sequence, it will be evident that the character has been scanned one time. Such fulfillment of the sequence is detected by a plurality of tandem connected storage devices arranged to be responsive to the succession of required conditions.

The present invention relates to character recognition systems and particularly to character recognition systems of the type in which an electronic scanner outlines each character to be recognized either for the purpose of determining the character location for subsequent analysis, for normalization of characters of different type styles or fonts, or for any other purpose.

In character recognition systems of this type, it is necessary to determine that the character outline has been traced once and one time only. It has previously been proposed to set up a unique set of conditions which delineate a particular location at one point on the boundary of a character, and to terminate the outline tracing operation when the conditions specified for this unique location have been fulfilled.

A principal object of the present invention is to provide an improved form of complete cycle detection apparatus to be employed in a system of the type described.

A further object of the present invention is to provide improved apparatus of the type described in which at least two unique locations along the outline of a character or pattern to be scanned are established, and a complete cycle is indicated only when the scanning pattern has traversed these locations in a specified sequence.

A further object of the invention is to provide an improved arrangement for detecting a complete scanning cycle for a character, in which the provision of at least two specified locations which the scanning pattern must traverse provides an arrangement in which a less accurate location of the scanning pattern is required.

Briefly described, the present arrangement contemplates the use of two specific locations on the border or located along the scanning path which is followed in scanning a character. When the scanning process commences, analog voltages are set up which may be utilized for determining the limits of particular locations concerned with the dimension of the character. Selected ones of these values are stored to provide two sets of limits which designate particular locations on the scanning path of the character. When these particular locations have been traversed in the proper sequence, it will be evident that the character has been scanned one time. Such fulfillment of the sequence may be detected by a plurality of tandem connected storage devices, arranged to be responsive to the succession of conditions required in the sequence.

The foregoing and other objects, features and advantages of the invention will be apparent from the following more particular description of a preferred embodiment of the invention as illustrated in the accompanying drawings.

In the drawings.

Similar reference characters refer to similar parts in each of the several views.

Figure 1:
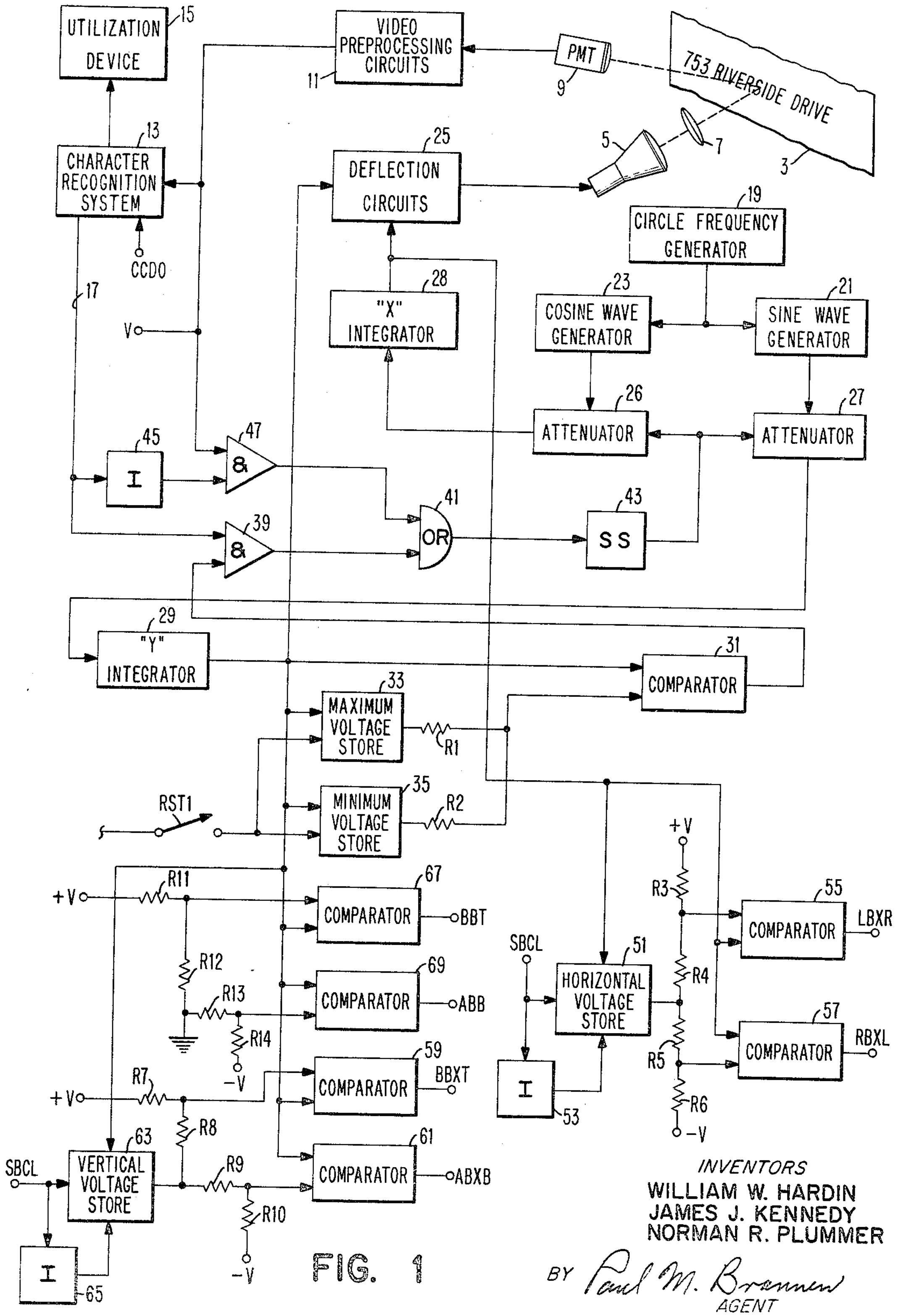
FIG. 1 is a diagrammatic view in block diagram form of a character recognition system employing a cathode ray tube scanner and shows a portion of a complete cycle detection apparatus constituting a preferred embodiment of the invention.

Referring to the drawings, and FIG. 1 particularly, the reference character 3 designates a document containing characters to be analyzed and recognized by the character recognition system and subsequently provided to some type of utilization device. The characters are scanned by means of a cathode ray tube scanner which includes a cathode ray tube 5 of suitable type, an optical system designated generally by the lens 7, and a photo responsive device such as a photomultiplier tube 9. As the cathode ray tube scanner provides scanning patterns of light across the document and therefore across the characters, the variations in reflection caused by the scanning of the characters are converted to video signals by the photomultiplier tube 9 from whence they are supplied to suitable video preprocessing circuits 11 where they are suitably amplified and shaped for subsequent use. From the video preprocessing circuits 11, the signals are supplied to a character recognition system 13, the details of which are not shown since they may take any one of several well known forms and the actual type of system involved is not germane to the present invention. Suffice it to say that as each character is scanned, the scanning information is supplied to the system 13, and at the end of the scanning of the character an output signal is supplied to a utilization device 15 indicative of the value of the character scanned.

As is usual in systems of this type, an end of character signal is generated when each of the characters is recognized and is supplied on an output line 17 for uses which will be subsequently described.

The circle following flying spot scanner is governed by suitable alternating current energy supplied from a source 19 designated as circle frequency generator, from whence sine and cosine waveshapes are derived by the sine wave generator 21 and cosine wave generator 23, respectively. As is well known in the cathode ray tube art, the combination of sine and cosine waves can be utilized to generate a circular motion of the spot of a cathode ray tube. The circuitry for combining the traces may be any one of a number of types well known in the art and is not shown in complete detail but is indicated generally by the rectangle 25, the output of which is supplied to cathode ray tube 5.

The cosine wave generator supplies its output to the deflection circuits via a controllable attenuator 26 and an X integrator 28. The sine wave generator 21 has its output connected to a controllable attenuator 27 the output of which is supplied to a Y integrator 29. These integrators constitute conventional integrating circuits that integrate the output of the attenuators 26 and 27 and provide an integration of the vertical and horizontal portions of the signals. The output of integrator 29 is connected to deflection circuits 25 and to one input of a compare circuit 31. The other input of compare circuit 31 is connected to the junction of a pair of resistors R1 and R2, which are connected to the outputs of two peak voltage storage devices 33 and 35 designated as maximum peak voltage store and minimum peak voltage store, respectively.

These storage devices are conventional peak voltage storing devices which act to provide an output indicative of the greatest voltage supplied thereto during a predetermined interval. The peak voltage stores 33 and 35 are set to an initial or reset condition by a resetting circuit here indicated schematically by the switch RST1 shown in the drawing. It will be deemed sufficient to say that the switch RST1 is closed at appropriate times to provide a suitable pulse to set the peak voltage stores 33 and 35 to their initial state. Thereafter, the vertical deflection signal supplied from the output of the Y integrator 29 is supplied to the peak voltage stores 33 and 35 which thereby retain the maximum and minimum voltage peaks seen during the excursions of the signal.

If the output of the maximum peak voltage store represents the maximum height of any given character, then the output of the minimum voltage store 35 would represent the bottom of the same character, and assuming that the resistors R1 and R2 are equal values, then their junction which forms the one input to the compare circuit 31 would provide a voltage representative of the center of the character.

The output of compare circuit 31 is supplied to one input of an AND circuit 39, the output of which is fed through one input of an OR circuit 41 the output of which is in turn connected to the input of the single shot 43. The other input to AND circuit 39 is the end of character signal line 17 from the character recognition system 13. This same signal line 17 is also connected via an inverter 45 to one input of an AND circuit 47, the output of which is connected to a second input of OR circuit 41. The other input of AND circuit 47 is connected to the output of the video preprocessing circuits 11, which is supplied to a terminal V, and which also constitutes the input to the character recognition system 13. The output of single shot 43 is supplied to the attenuators 26 and 27 and controls them in such manner that during the time that single shot 43 is providing an output, the signal supplied through attenuators 26 and 27 will be reduced in magnitude.

It is believed that the description of the invention will be enhanced by describing the operation of the apparatus described above under various operating conditions before reciting the details of the remaining apparatus.

As a first assumption, it will be assumed that a character is in the process of being scanned for its outline by the circle following technique in which the cathode ray tube 5 and the optical system 7 provide a pattern on document 3 in accordance with signals supplied to deflection circuits 25 in such manner as to cause the characters to be scanned by a circle following technique in which the size of the circle is attenuated during that portion of the time that there is signal output from the photomultiplier tube 9; and when no portion of the character is being intercepted by the scanning spot, the radius of the circle is increased to some other dimension. The circular wave shapes are generated in a manner well known in the art by the circle frequency generator 19 with the associated sine wave generator 21 and cosine wave generator 23.

The cosine wave generator signal is supplied to deflection circuits 25 via the attenuator 26 and X integrator 28, while attenuator 27 controls the supply of sine wave signals to the deflection circuits 25 via the Y integrator 29.

At this time, the Y integrator 29 will cause maximum and minimum peak voltages to be stored in the respective peak voltage stores 33 and 35 as the circle following scan proceeds around the character, so that the voltage of the junction of resistors R1 and R2 will, when the scanning of the entire character outline has been completed, constitute an analog voltage representing the center of the character in the vertical direction. Any outputs which occur from the compare circuit 31 at this time will not have any effect on the operation of the system, since although these signals will be supplied to one input of the AND circuit 39, the other input will be down because line 17 will not have a signal thereon in view of the fact that the character recognition system would be in the process of receiving character data and analyzing it for the value of the character scanned.

In order that the video signals can properly control the amplitude of the sine and cosine functions, the video signals resulting from the operation of photomultiplier tube 9, after having been amplified and shaped by the preprocessing circuits 11, are passed by AND circuit 47. AND circuit 47 is rendered active at this time in view of the fact that line 17 is down and therefore the output of the inverter 45 will be up. The video signals will be passed accordingly by AND circuit 47 through OR circuit 41 to control the single shot 43. In this case each time that a "black" video signal occurs, single shot 43 will accordingly be fired and cause attenuators 26 and 27 to reduce the circle size. When the scan proceeds away from the character portion, the video signal will cease and the signal supplied to single shot 43 will also cease, whereupon the attenuators 26 and 27 will permit the circle generating signals to resume their normal amplitude.

In this manner the circle following scan will proceed to outline the character and the information gained therefrom may be used either for normalizing the character for some subsequent type of different character analysis scanning operation, or the data secured by the circle following operation may be suitably decoded to provide such information. The manner in which the character is actually analyzed for its value is not germane to the present invention and hence is not explained in detail.

Let it now be assumed that the character has been adequately scanned for recognition purposes and as a result, a signal is provided on the line 17 indicating that the circle following scan should leave the previous character and proceed to the next character. At this time the condition of AND circuits 39 and 47 is reversed, as a result of the signal on line 17, AND circuit 39 now being enabled and AND circuit 47 being disabled, so that the normal video signals will now not have any effect on the operation of the circle following circuits.

The previous character having been scanned and the reversal of the switching circuits having taken place as described above, the analog voltage value representing the center of the character existing at the junction of resistors R1 and R2 is now utilized as an "artificial black" value in the vertical direction which, when compared with the instantaneous value of the deflection voltage as determined by the output of the Y integrator, determines the operation of the circle following circuitry. For example, assuming that the output of the integrator 29 is greater (that is, more positive) than the character center voltage, then an output will be present at the output of compare circuit 31 and will enable the AND circuit 39 to supply a signal via OR circuit 41 to single shot 43, whereupon the attenuators 26 and 27 will cause attenuation of the scanning circle in the same fashion as if the scanning spot had actually encountered a black portion of a character.

When the output of integrator 29 is less than the character center voltage, no output will be provided from compare circuit 31 and as a result the single shot 43 does not supply control signals to attenuators 26 and 27 and hence the circle described by the cathode ray tube spot is of the larger magnitude. It will be readily apparent that under such conditions, the flying spot scanner will continue to execute a curve following mode of operation with the variable size circles causing the circuitry to operate in the same fashion as if the cathode ray tube spot were actually encountering a black line or band extending from the center of the previous character.

Such an operation will continue until the next character is encountered. At this time the photomultiplier tube 9 will begin picking up actual character signals and supplying video signals to the character recognition system 13 and to terminal V. As a result, after this action has occurred to the extent such that it is considered that the scanning beam has truly encountered the next character, the output on line 17 will be removed and, as a result, AND circuit 39 will be disabled and AND circuit 47 will be enabled as a result of the inverted output via inverter 45.

At this time, the conditions are reverted to that first described in which the circle following operation takes place in its usual fashion to trace the outlines of the next character. At the same time that the character recognition system indicates that a character is to be scanned, suitable reset control circuit means which may also be governed by the character recognition system 13 but which are not shown in detail are operated to provide a reset signal to the peak voltage stores 33 and 35. For the sake of illustrating the operation, this switching arrangement has been shown in the drawing as simply consisting of a reset switch RST1 so that when the proper time arrives, the reset switch RST1 is closed and provides a pulse to the peak voltage stores 33 and 35 which resets them to a normal or initial condition. Following this time, during the normal scanning of the next character by the curve following beam, the peak voltage stores 33 and 35 will again proceed to determine an analog voltage which is representative of the center of that character, as has been previously described.

Now considering the remainder of the apparatus shown in FIG. 1, this equipment comprises devices connected to the outputs of X integrator 28 and Y integrator 29, arranged so that during the time that the character outline is being traced, the limits of a stop band, the center line of which is the artificial tracking level described above, and the limits of a stop box associated with the band will be set up in the form of digital voltages obtained by comparing the values of analog voltages derived from the scanning of the character. With respect to the horizontal voltages, a horizontal voltage store 51 is provided, which is rendered effective on the supply thereto of a signal from a terminal SBCL and which is reset by supplying the signal from terminal SBCL through an inverter 53. With this arrangement, the horizontal voltage store 51 will in effect follow the output of the X integrator 28; and when a signal is supplied via terminal SBCL, the particular voltage existing at that time and stored in device 51 will effectively be frozen at the value which exists at the time the signal is supplied to freeze the store 51. The output voltage is supplied to a voltage dividing network comprising resistors R3–R6 which have their end terminals connected to a source designated as +V and −V. The parts are proportioned and arranged so that outputs taken from the junctions of resistors R3 and R4 and another output from the junction of resistors R5 and R6 will represent the position of the character scanning trace with respect to designated horizontal limits. In effect, the output taken from the junction of resistors R3 and R4 represents the right side or right limit of the stop box location while the voltage at the output of the junction of resistors R5 and R6 represents the left side of the stop box location. These outputs are supplied to comparators 55 and 57, respectively, which have their other inputs connected to the output of X integrator 28 directly. Accordingly, if the deflection signal is such that the scanning beam is to the left of the right side of the stop box, a signal will be present at terminal LBXR. Similarly, if the position of the scanning beam is to the right of the left side of the stop box location, a signal will be present at terminal RBXL. Accordingly, the outputs of comparators 55 and 57 can be utilized to determine whether or not the beam is travelling horizontally within the limits of the stop box location.

The vertical limits of the stop box are determined by a similar set of devices connected to the output of Y integrator 29, comprising the comparators 59 and 61, one input to each of the comparators being the output of Y integrator 29, the outer inputs being connected to the junctions of a voltage divider network including resistors R7–R10. The junction of resistors R7 and R8 is connected to one input of comparator 59, and the junction of resistors R9 and R10 is connected to one of the inputs of comparator 61. A vertical voltage store 63 of the same type as horizontal store 51 has its input connected to the output of Y integrator 29 and is also supplied with enabling and resetting voltages from the terminal SBCL, the resetting voltage being provided through an inverter 65. The vertical voltage store 63 stores the instantaneous voltage value representative of the vertical deflection of the scanning beam at the time that the signal SBCL is supplied. By comparing this voltage with the voltages across the voltage divider and supplying the outputs to the comparator for later comparison with the vertical deflection voltage as the scanning beam commences a second cycle of scanning, output signals are provided from comparators 59 and 61 to terminals BBXT and ABXB, respectively, indicating below box top and above box bottom. Thus, it can be seen that when output signals are present on these two terminals that the scanning beam is located vertically within the limits of the stop box location.

Another set of comparators provides output signals which indicate whether or not the scanning beam is above or below the stop band. These comparators, 67 and 69, have one input connected to the output of Y integrator 29 and have their other input connected to a voltage divider comprising resistors R11–R14, the junction between R12 and R13 being connected to ground, the junction between R11 and R12 being connected to comparator 67, and the junction between R13 and R14 being connected to comparator 69. In this instance, it is presumed, for simplicity of explanation, that the voltage representing the center or artificial tracking level which constitutes the center of the stop band is at ground potential, hence the use of ground as a reference potential for this voltage divider. The fixed inputs to comparators 67 and 69, therefore, represent predefined distances above and below the ground or artificial tracking level potential. With the other inputs of the comparators connected to the output of the Y integrator, comparators 67 and 69 will provide outputs which are supplied to terminals BBT and ABB, indicating, respectively, that the scan is below the top of the band or above the bottom of the band. Accordingly, it can be clearly seen that these two outputs may be utilized to determine whether or not the scan is within or without the limits designated for the stop band.

Having thus shown how the various digital signals are provided to indicate particular locations of the scanning beam, it will now be shown how this information is combined when the beam is located at a predetermined sequence of these locations to provide an output signal indicating that a complete scanning cycle has occurred.

Figure 2:
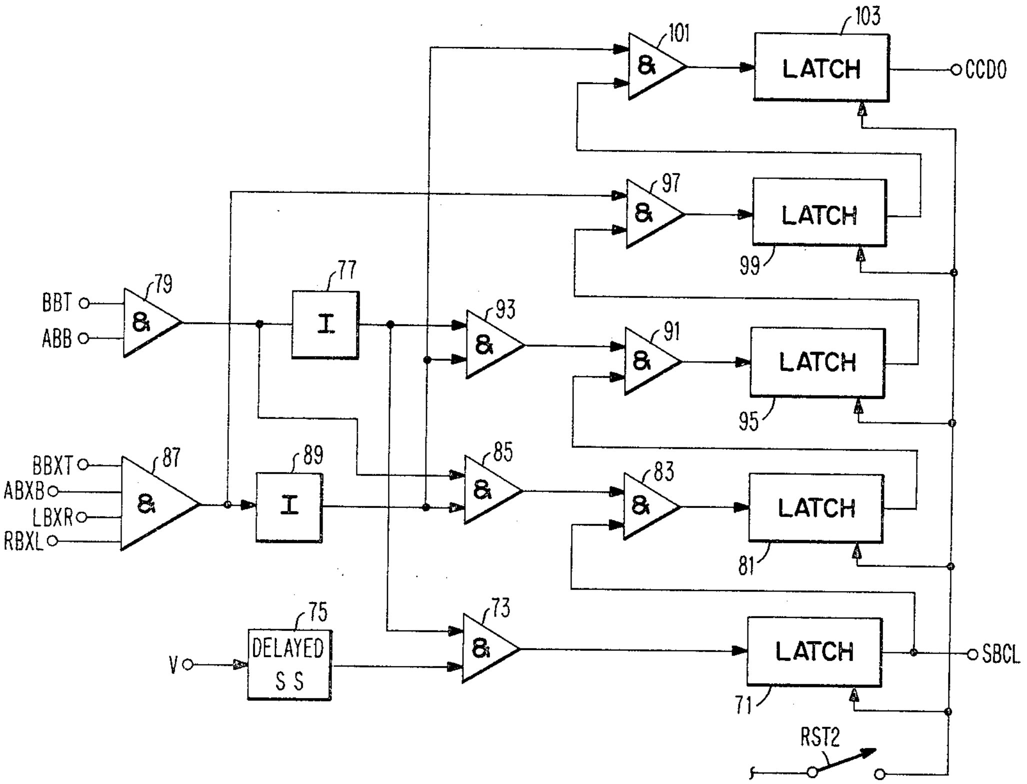
FIG. 2 is a diagram of the logic circuits which detect the fulfillment of the particular sequence of scanning operations required to indicate a complete scanning cycle for the apparatus of FIG. 1.

The circuitry shown in FIG. 2 includes five latches of the conventional type well known in the art wherein an input supplied to the latch will turn the output on and the output thereafter will remain on even though the input is removed until such time as a suitable reset signal is supplied to the latch. The output of each of the latches, considered from bottommost to topmost, is supplied to the next succeeding latch so that the output of the previous latch is a necessary condition for enabling the succeeding latch. The first latch in the series is that which governs the stop box control function, and this latch is turned on by the supply thereto of a signal from an AND circuit 73, the inputs of which are the output from a delayed single shot 75, and an inverter 77. Delayed single shot 75 supplies a pulse to the AND circuit 73 only after a signal is present on terminal V for a predetermined interval of time, say for example, 100 microseconds. The purpose of providing this type of input is to insure that the character scanning beam is actually following the video signal resulting from encountering a character rather than the artificial follow level which the system utilizes between characters. Also, it is essential that the scanning operation shall have actually commenced and that the scanning beam be outside the stop band. This indication is provided by the output of inverter 77, the input of which is connected to an AND circuit 79, the inputs to this AND circuit being connected to terminals BBT and ABB, whereby AND circuit 79 supplies an output when and only when the character scanning beam is within the stop band limits. In view of the fact that this signal is inverted by inverter 77, it will be apparent that latch 71 is set on only when the character scanning beam has been following the character for a predetermined time interval and the beam is not within the stop band. When latch 71 is set on, an output signal is provided to the terminal SBCL which enables the horizontal and vertical voltage stores 51 and 63, respectively, described above.

As the character scanning operation proceeds around the outline of the character, four successive conditions must be met before an output is provided indicative of the fact that a complete scanning cycle around the periphery of the character has been accomplished.

The first condition which is required to set latch 81 on is that the latch 71 be on, since one of the inputs to the AND circuit 83 is the output of latch 71. The other input to AND circuit 83 is the output of an AND circuit 85, the inputs of which are connected to the outputs of AND circuit 79 and also to an AND circuit 87 via an inverter 89. AND circuit 87 has four inputs, BBXT, ABXB, LBXR and RBXL. Considering the box limits which the signals on these terminals represent, it can be seen that the AND circuit 87 provides an output therefrom when and only when the scanning beam is within the limits of the stop box. Since the output of inverter 89 represents the inverted signal from AND circuit 87, AND circuit 85 will provide an output when and only when the scanning beam is outside of the stop band and also outside of the stop box. Under these conditions with latch 71 on, the AND circuit 83 will provide an output to set latch 81 on.

With latch 81 turned on, one input of AND circuit 91 is enabled, the other input being supplied from an output of AND circuit 93 which has its inputs connected to the output of inverters 77 and 89, respectively. With these connections, an output will be supplied from AND circuit 91 to turn on latch 95 when the sequence indicates that the character scanning beam is not within the stop band and not within the stop box, assuming that the preceding conditions have been met.

With latch 95 turned on, one input of AND circuit 97 is enabled, the other input to this AND circuit being supplied from the output of AND circuit 87. An output from AND circuit 97 will turn latch 99 on when the sequence reaches the point that the scanning beam pattern has passed within the box, this indication being supplied by the output of AND circuit 87. With latch 99 turned on, when the scanning beam pattern passes out of the stop box, the output of inverter 89 will come up and both inputs will be enabled at that time for an AND circuit 101 which supplies a signal to turn on latch 103. The output of latch 103 is supplied to a terminal CCDO, this signal indicating the complete cycle detection. This signal may be supplied to the character recognition system for initiating a character analysis scan or for any other suitable purpose. After the complete cycle detection operation has taken place, operation of the resetting circuit by any suitable means, here shown by a switch RST2, will reset all of the latches to their off condition preparatory to the cycling of the system for detecting another complete cycle of character tracing.

Figure 3:
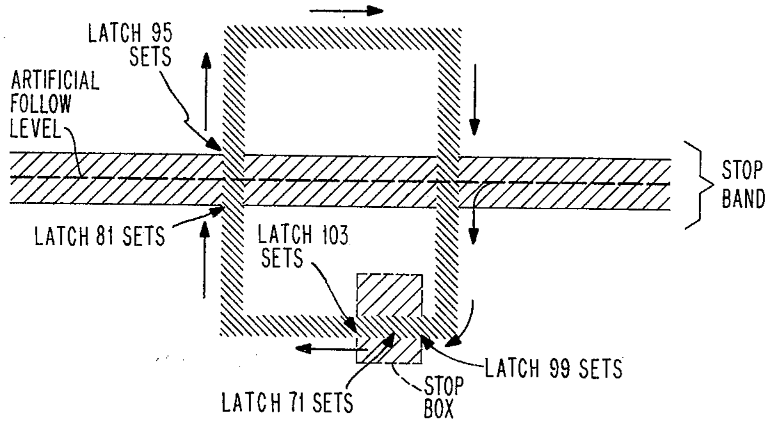
FIG. 3 is a diagrammatic view illustrating the relationships of the scanning pattern to the limits set up for defining a sequence which determines that a complete scanning cycle has occurred.

FIG. 3 of the drawings shows a diagrammatic illustration of the path followed by the scanning beam and illustrates the relative possible relations for one arrangement of the stop box and stop band. From an examination of the drawing in which the artificial follow level is shown as a dashed line extending through the center of the character O shown in block form, the stop band constitutes a band of predetermined width having the artificial follow level as its center line. The stop box in this instance is shown as a rectangular area below the stop band and lying to the right of the vertical center line of the character. The arrows show the direction in which the character scanning beam moves, i.e. between the characters it moves along the center line until the next character is encountered, at which time it starts downwardly and traces the outline of the character. After the scanning beam has moved out of the stop band area and has been following the character for a period determined by the delayed single shot 75 of FIG. 2, the stop box control latch will be turned on so that the stop band and stop box conditions may be set up.

With the relationship shown in FIG. 3, the first sequential condition is met as the scanning beam moves up on the left hand portion of the character, namely that the scanning is taking place inside the stop band while outside the box. The second condition would be fulfilled when the scanning beam moves out of the top of the stop band on the left hand side of the character, namely that the scanning is taking place outside the band and the box simultaneously. The third condition will be satisfied as the beam moves on around and comes down on the right hand outside portion of the character so that it enters the right hand side of the stop box, in which case the scanning will then be inside the box. When the scanning beam again moves outside the stop box area, the last condition will be satisfied and the output indicating a complete scanning cycle will be suppied to terminal CCDO.

From the foregoing it will be apparent that the present invention provides an arrangement for detecting a complete scanning cycle of a character or pattern by a scanning beam which moves around the character or pattern. The arrangement contemplates means for setting up analog voltages representing the limits of two locations on the periphery of the character and for determining that these locations have been traversed in a predetermined sequence by the scanning beam. The arrangement shown is exemplary and it will be understood by those skilled in the art that various detailed circuit arrangements well known in the art may be used in implementing the system as described.

While the invention has been particularly shown and described with reference to a preferred embodiment thereof, it will be understood by those skilled in the art that various changes in form and details may be made therein without departing from the spirit and scope of the invention.

What is claimed is:

1. In a scanning system having a scanning beam which traces the outline of patterns on a scanned surface, means for detecting the completion of a scanning cycle, comprising, in combination, first location determining means effective to determine limits which are described by a band of predetermined width extending horizontally across the pattern to be scanned, comprising first analog voltage generating means for generating a first voltage corresponding to the centerline of said band, and means for comparing said first voltage to a second voltage representing the vertical position of the scanning beam to provide a first output signal when said beam is below the top of said band and a second output when said beam is above the bottom of said band, and means for combining said first and said second signals to provide a third output signal indicative of the beam presence in said band;

second location determining means effective to determine limits which are described by a circumscribed area along the boundary of the pattern to be scanned, comprising second analog voltage generating and storing means for generating a third voltage and a fourth voltage corresponding to the horizontal limits of said area, third analog voltage generating and storing means for generating a fifth and a sixth voltage corresponding to the vertical limits of said area, and means for combining said third, fourth, fifth and sixth voltages to provide a fourth output signal when said beam is in said area; and sequence determining means governed by said third and fourth output signals for detecting the passage of said scanning beam in a predetermined sequence through said band and said area, comprising a first, a second, a third, and a fourth latch means, said latch means being connected so that they are sequentially set on by the supply thereto of said third and said fourth output signals in proper sequence to indicate the passage of the beam through said band and through said area, in that order.

References Cited

UNITED STATES PATENTS 3,353,024 11/1967 Stockdale ---------- 250—202

MAYNARD R. WILBUR, Primary Examiner

R. F. GNUSE, Assistant Examiner

U.S. Cl. X.R.

250—202